(12) United States Patent
Lasserre et al.

(10) Patent No.: US 10,574,987 B2
(45) Date of Patent: Feb. 25, 2020

(54) METHOD AND DEVICE FOR ENCODING A HIGH-DYNAMIC RANGE IMAGE

(71) Applicant: INTERDIGITAL VC HOLDINGS, INC., Wilmington, DE (US)

(72) Inventors: Sebastien Lasserre, Thorigne Fouillard (FR); Fabrice Le Leannec, Mouaze (FR); David Touze, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 14 days.

(21) Appl. No.: 15/106,242

(22) PCT Filed: Dec. 15, 2014

(86) PCT No.: PCT/EP2014/077675
§ 371 (c)(1),
(2) Date: Jun. 17, 2016

(87) PCT Pub. No.: WO2015/091311
PCT Pub. Date: Jun. 25, 2015

(65) Prior Publication Data
US 2016/0316205 A1 Oct. 27, 2016

(30) Foreign Application Priority Data
Dec. 19, 2013 (EP) ..................... 13306789

(51) Int. Cl.
*H04N 19/124* (2014.01)
*H04N 19/154* (2014.01)
(Continued)

(52) U.S. Cl.
CPC ......... *H04N 19/124* (2014.11); *H04N 19/154* (2014.11); *H04N 19/164* (2014.11);
(Continued)

(58) Field of Classification Search
CPC ............. G06T 7/73; G06T 2207/30201; G06T 7/0004; G06T 2207/30164; G06T 7/70;
(Continued)

(56) References Cited

U.S. PATENT DOCUMENTS

| | | | |
|---|---|---|---|
| 5,850,257 A * | 12/1998 | Sakata | H04N 5/21 348/241 |
| 7,483,486 B2 * | 1/2009 | Mantiuk | H04N 19/46 375/240.01 |

(Continued)

FOREIGN PATENT DOCUMENTS

| | | |
|---|---|---|
| CN | 103124347 | 5/2013 |
| EP | 2317769 | 5/2011 |

(Continued)

OTHER PUBLICATIONS

Memon et al., "Simple Method for Enhancing the performance of lossy plus lossless image compression schemes", Journal of Electronic Imaging, vol. 2, No. 3, Jul. 1993, pp. 245-252.

(Continued)

*Primary Examiner* — Leron Beck
*Assistant Examiner* — Kehinde Abimbola
(74) *Attorney, Agent, or Firm* — Brian Dorini; Ronald Kolczynski (57) ABSTRACT

The present disclosure generally relates to a method and device for encoding an image block, characterized in that it comprises: obtaining (101) a low-spatial-frequency version ($L_{lf}$) of a luminance component of the image block, said the obtained luminance component of the image block; obtaining a quantized luminance component ($L_{lf,Q}$) of the image block by quantizing (102) the obtained luminance component ($L_{lf}$) of the image block; obtaining (103) a differential luminance component ($L_r$) by calculating the difference between the luminance component (L) of the image block
(Continued)

and either the quantized luminance component ($L_{lf,Q}$) of the image block or a decoded version ($\hat{L}_{lf,Q}$) of the encoded quantized luminance component of the image block; encoding (104) the quantized luminance component ($L_{lf,Q}$) of the image block using at least one frequency coefficient of a set of frequency coefficients which is usually obtained from a block-based spatial-to-frequency transform for encoding the luminance component of the image block; and encoding (105) the differential luminance component ($L_r$) using the remaining frequency coefficients of said set of frequency coefficients.

20 Claims, 5 Drawing Sheets (51) Int. Cl.
*H04N 19/164* (2014.01)
*H04N 19/176* (2014.01)
*H04N 19/186* (2014.01)
*H04N 19/36* (2014.01)
*H04N 19/33* (2014.01)

(52) U.S. Cl.
CPC ......... *H04N 19/176* (2014.11); *H04N 19/186* (2014.11); *H04N 19/33* (2014.11); *H04N 19/36* (2014.11)

(58) Field of Classification Search
CPC ...... H04N 9/77; H04N 5/3575; H04N 5/3658; H04N 5/37457; H04N 9/877; H04N 19/124; H04N 19/154; H04N 19/164; H04N 19/176; H04N 19/186; H04N 19/61; H04N 19/44; H04N 19/182; H04N 19/593; H04N 19/70; H04N 19/91; H04N 19/136; H04N 19/46; H04N 5/57; H04N 19/11; H04N 19/463
See application file for complete search history.

(56) References Cited

U.S. PATENT DOCUMENTS

| | | | | |
|---|---|---|---|---|
| 8,938,095 B2* | 1/2015 | Yamashita | ............ | H04L 9/3239 382/103 |
| 2004/0071363 A1* | 4/2004 | Kouri | ................ | G06K 9/00516 382/276 |
| 2004/0223662 A1* | 11/2004 | Urano | ................ | G06T 3/403 382/299 |
| 2006/0002611 A1* | 1/2006 | Mantiuk | ................ | H04N 19/46 382/239 |
| 2008/0012856 A1* | 1/2008 | Yu | ................ | G06T 7/0012 345/424 |
| 2013/0156263 A1* | 6/2013 | Yamashita | ............ | H04L 9/3239 382/103 |
| 2014/0029665 A1* | 1/2014 | Damkat | ........... | H04N 19/00139 375/240.03 |
| 2017/0263211 A1* | 9/2017 | Miller | ................ | G06F 3/14 |

FOREIGN PATENT DOCUMENTS

| | | |
|---|---|---|
| WO | WO2009003499 | 1/2009 |
| WO | WO2012137114 | 10/2012 |
| WO | WO2013086169 | 6/2013 |

OTHER PUBLICATIONS

JCTVC-K1003: Bross et AL "High Efficiency Video Coding (HEVC) text specification draft 9".
Richardsson et AL: "H.264 and MPEG-4 Video Compression".
Suhring: "H.264 AVC Reference Software", http://iphome.hhi.de/suehring/tml/download/.
ISO/IEC JTC1/SC29/WG11 MPEG2013/ M30167: Basse et AL: "Proposed Standardization of XYZ Image" Jul. 2013, Vienna, Austria.

* cited by examiner

METHOD AND DEVICE FOR ENCODING A HIGH-DYNAMIC RANGE IMAGE

This application claims the benefit, under 35 U.S.C. § 365 of International Application of PCT/EP2014/077675, filed Dec. 15, 2014, which was published in accordance with PCT Article 21(2) on Jun. 25, 2015, in English, and which claims the benefit of European patent application No. 13306789.2, filed Dec. 19, 2013.

1. FIELD OF DISCLOSURE

The present disclosure generally relates to image/video encoding and decoding an image. In particular, the technical field of the present disclosure is related to encoding/decoding of an image block whose pixels values belong to a high-dynamic range.

2. TECHNICAL BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A typical approach for encoding an HDR image is to reduce the dynamic range of the image in order to encode the image by means of a traditional encoding scheme (initially configured to encode LDR images).

According to a first approach, a tone-mapping operator is applied to the input HDR image and the tone-mapped image is then encoded by means of a traditional 8-10 bit depth encoding scheme such as JPEG/JPEG200 or MPEG-2, H.264/AVC for video (Karsten Suhring, H.264/AVC Reference Software, http://iphome.hhi.de/suehring/tml/download/, the book of I. E. Richardson titled «H.264 and MPEG-4 video compression» published in J. Wiley & Sons in September 2003). Then, an inverse tone-mapping operator is applied to the decoded image and a residual is calculated between the input image and the decoded and inverse-tone-mapped image. Finally, the residual is encoded by means of a second traditional 8-10 bit-depth encoder scheme.

The main drawbacks of this first approach are the use of two encoding schemes and the limitation of the dynamic range of the input image to twice the dynamic range of a traditional encoding scheme (16-20 bits).

According to a second approach, the input HDR image is converted in order to get a visually lossless representation of the image pixels in a colour space in which values belong to a dynamic range which is compatible with a traditional 8-10 or an extended 12, 14 or 16 bits depth encoding scheme such as HEVC for example (B. Bross, W. J. Han, G. J. Sullivan, J. R. Ohm, T. Wiegand *JCTVC-K*1003, "*High Efficiency Video Coding (HEVC) text specification draft 9,*" October 2012) and its high bit-depth extensions.

Using a traditional encoding scheme for encoding an HDR image involves using a same bit depth for encoding the whole image. That involves large sizes of the compressed images. Consequently, such typical approaches cannot be used in applications requiring high coding performances such, for example, in a transmission context where high compression rates are required.

3. SUMMARY OF THE DISCLOSURE

The disclosure sets out to remedy some of the drawbacks of the prior art with a method for encoding an image block, characterized in that it comprises:

obtaining a low-spatial-frequency version of a luminance component of the image block, said the obtained luminance component of the image block;

obtaining a quantized luminance component of the image block by quantizing the obtained luminance component of the image block;

obtaining a differential luminance component by calculating the difference between the luminance component of the image block and either the quantized luminance component of the image block or a decoded version of the encoded quantized luminance component of the image block;

encoding the quantized luminance component of the image block using at least one frequency coefficient of a set of frequency coefficients which is usually obtained from a block-based spatial-to-frequency transform for encoding the luminance component of the image block; and encoding the differential luminance component on the remaining frequency coefficients of said set of frequency coefficients.

The brightness values of the pixels which belong to an image block usually slightly fluctuate around a mean brightness value calculated from the pixel values which belong to this image block. Then, subtracting a version of the low-spatial-frequency version of the luminance component of the image block from the luminance component of this image block reduces the dynamic range of the resulting differential luminance component whose the mean value is closed to 0.

Thus, if the dynamic range of the differential luminance component is low, both the quantized luminance component of the image block and the differential luminance component of this image block may be encoded on frequency coefficients which belong to a same set of frequency coefficients usually obtained from a block-based spatial-to-frequency transform for encoding a luminance component of the image block. If the dynamic range of the differential luminance component is not low enough, a pre-processing (clip or dynamic reduction) of the differential luminance component performs such that the encoding on frequency coefficients is made possible.

The encoding efficiency of the image block is thus improved compared to a usual encoding using a block-based spatial-to-frequency transform because such a usual encoding uses two sets of frequency coefficients: one for the encoding of the quantized luminance component of the image block, and one for the encoding of the differential luminance component.

Consequently, the combination of the features allows an optimal trade-off between a high compression rate, few visually losses and low encoding/decoding complexity.

According to an embodiment, the method further comprises:

obtaining at least one colour component of the image block; and encoding each colour component of the image block.

According to an embodiment, the luminance component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and wherein the method further comprises before encoding the differential luminance component:

obtaining a transformed differential luminance component by transforming the differential luminance component according to a transform which depends on an upper bound of the metric which enables a control of the visual losses in a displayed decoded version of the image block.

According to an embodiment, each colour component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and wherein the method further comprises before encoding each colour component of the image block:

obtaining at least one transformed colour component by transforming each colour component of the image block according to a transform which depends on an upper bound of the metric which enables a control of the visual losses in a displayed decoded version of the image block. Obtaining an expression of a low-spatial-frequency version of the luminance component of an image block in a perceptual space and quantizing this version in the perceptual space by maintaining, below an upper bound, the values values of a metric which enables a control of the visual losses in a displayed decoded version of the image, ensures a control of the visual losses in a displayed decoded version of the image block and even a visual-lossless quantization of this version when the upper bound of the metric is lower or equal to the perceptual threshold.

According to an embodiment, the upper bound is determined according to reference lighting conditions of the display of a decoded version of the encoded image block and according to either the quantized luminance component of the image block or a decoded version of the encoded quantized luminance component of the image block.

According to an embodiment, the upper bound is determined from the ratio of the brightness value of either the quantized luminance component of the image block or a decoded version of the encoded quantized luminance component of the image block over a maximal environmental brightness value.

According to an embodiment the transform is a normalization of the differential luminance component and potentially of each color component by means of the upper bound.

According to an embodiment, the original dynamic range of the obtained luminance component of the image block is reduced before quantizing the obtained luminance component of the image block, and the dynamic range of either the quantized luminance component of the image block or a decoded version of the encoded quantized luminance component of the image block, is increased to reach the original dynamic range before calculating the differential luminance component and the upper bound.

According to an embodiment, the quantized luminance component of the image block is lossless-encoded.

According to an embodiment, the differential luminance component or the transformed differential luminance component is clipped to reach a differential luminance component or a transformed differential luminance component with a dynamic range lower than or equal to a targeted dynamic range.

According to another of its aspects, the disclosure relates to a method for encoding an image, characterized in that it comprises:

obtaining at least one image block from the image, encoding each image block according to an above method.

According to an embodiment, said at least one image block is obtained by recursively dividing an image block until a criteria is not reached.

According to another of its aspects, the disclosure relates to a method for decoding a bitstream representing a luminance component of an image block, characterized in that it comprises:

obtaining a set of frequency coefficients is obtained by a at least partially decoding of the bitstream, said set of frequency coefficients being relative to a block-based spatial-to-frequency transform of the image block to be decoded;

splitting the set of frequency coefficients into two subsets of frequency coefficients: one represents an estimate of a low-spatial-frequency version of a luminance component, and the other one represents an estimate of a differential luminance component; and adding together the estimate of a low-spatial-frequency version and the estimate of a differential luminance component to get an estimate of the image block.

According to another of its aspects, the disclosure relates to a method for decoding an image from a bitstream, characterized in that it comprises:

obtaining data relative to at least one image block of an image to be decoded by a at least partially decoding of the bitstream, decoding each image block according to an above method.

According to another of its aspects, the disclosure relates to a device for encoding an image block and for decoding a bitstream representing a luminance component of an image block.

The specific nature of the disclosure as well as other objects, advantages, features and uses of the disclosure will become evident from the following description of a preferred embodiment taken in conjunction with the accompanying drawings.

4. LIST OF FIGURES

The embodiments will be described with reference to the following figures.

5. DETAILED DESCRIPTION OF A PREFERRED EMBODIMENT OF THE DISCLOSURE

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding an image but extends to the encoding/decoding of a sequence of images (video) because each image of the sequence is sequentially encoded/decoded as described below.

References to elements which are identical in the FIGS. refer to the same elements.

Figure 1:
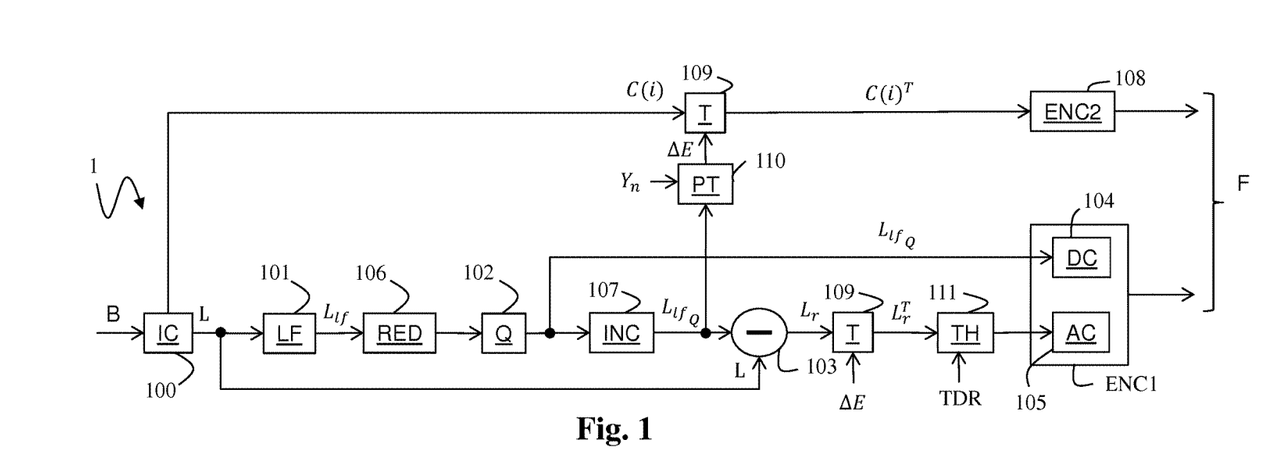
FIG. 1 shows a block diagram of the steps of a method for encoding an image block B in accordance with an embodiment of the disclosure.

FIG. 1 shows a block diagram of the steps of a method for encoding an image block B in accordance with an embodiment of the disclosure.

In step 100, a module IC obtains each component of the image block B to be encoded. The image block B comprises a luminance component L and potentially at least one colour component C(i) with i an index which identifies a colour component of the image block B.

But the disclosure isn't limited neither to a grey image block (no colour component) nor to an image block with one, two or more colour components. When a grey level image block is encoded as described below, do not consider the parts of the description which refer to the colour components.

In step 101, a module LF obtains a low-spatial-frequency version $L_{lf}$ of the luminance component L of the image block B.

According to an embodiment, the module LF is configured to calculate the low-spatial-frequency version $L_{lf}$ by assigning to each pixel of the image block B a mean value computed by averaging the pixel values of the image block B.

The disclosure is not limited to a specific embodiment for computing a low-spatial-frequency version of the image block B and any low-pass filtering, down-sampling or averaging of the luminance component of the image block B (or of the image at which the image block B belongs) may be used.

In step 102, a module Q obtains a quantized luminance component ($L_{lf,Q}$) by quantizing the low-spatial-frequency version $L_{lf}$ using a determined number of bits, typically 8, 10 or 12 bits.

Quantizing a component using a number of bits means determining, for each pixel value of the component, a value belonging to a range of values defined from the number of bits. For example, component value belongs to the range [0; 255] when a component is quantized with 8 bits.

According to an embodiment, the number of bits is determined according to the capabilities of the encoding/decoding scheme used later (step 104).

According to an embodiment, the quantization is a quantization with a constant step size. Typically the step size equals 1.

Figure 2:
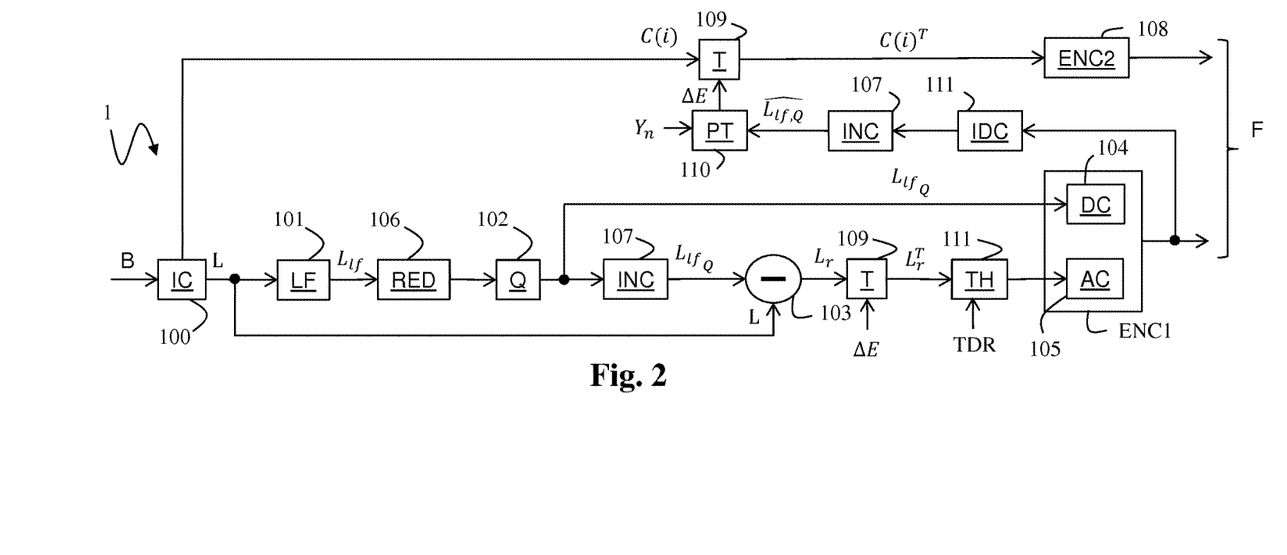
FIG. 2 shows a block diagram of the steps of a method for encoding an image block B in accordance with a variant of the embodiment of the disclosure.
Figure 4:
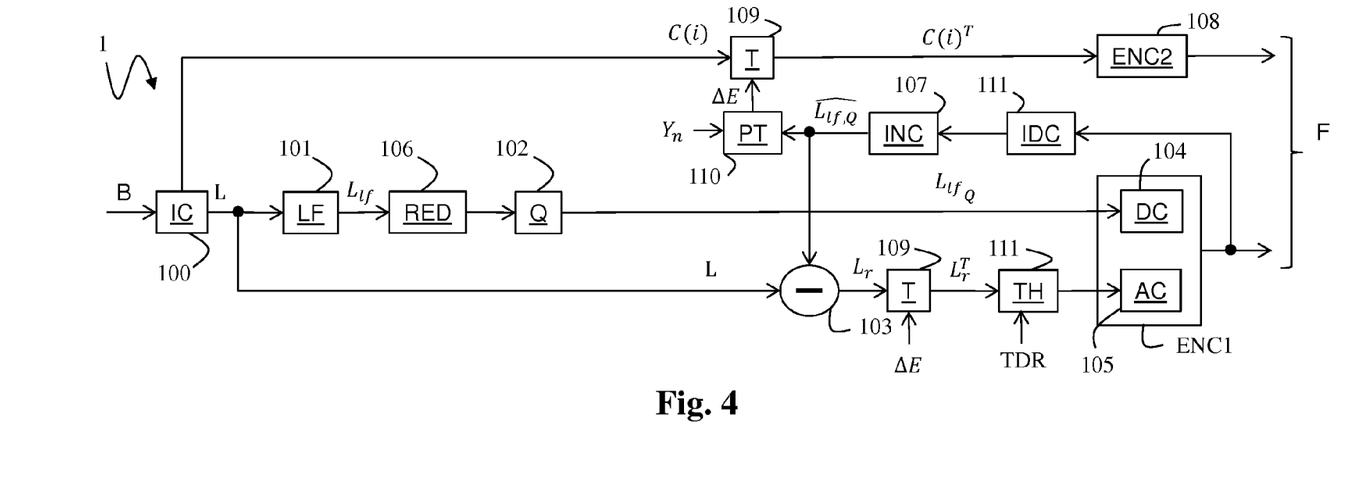
FIG. 4 shows a block diagram of the steps of a method for encoding an image block B in accordance with a variant of the embodiment of the disclosure.

In step 103, a differential luminance component $L_r$ is obtained by calculating the difference between the luminance component L and either the quantized luminance component $L_{lf,Q}$ of the image block (illustrated in FIGS. 1 and 2) or a decoded version $\widetilde{L_{lf,Q}}$ of the encoded quantized luminance component of the image block (illustrated in FIGS. 2 and 4).

The quantized luminance component $L_{lf,Q}$ and the differential luminance component $L_r$ are encoded by means of an encoder ENC1 which usually uses a set of frequency coefficients obtained from a block-based spatial-to-frequency transform for encoding the luminance component L of the image block.

The disclosure is not limited to a specific block-based spatial-to-frequency transform and any well-known block-based spatial-to-frequency transform may be used such as a Discrete Cosinus Transform (DCT), a Discrete Sine Transform (DST), Hadamard Transform or any other suitable spatial transform which compacts the pixel energy into transformed coefficients.

A restriction is that the block-based spatial-to-frequency transform provides a set of frequency coefficients for representing the luminance component of an image block to be encoded.

In step 104, a module DC encodes the quantized luminance component $L_{lf,Q}$ using at least one frequency coefficient of a set of frequency coefficients which is usually obtained from a block-based spatial-to-frequency transform for encoding luminance component of the image block.

According to an embodiment of the step 104, the quantized luminance component $L_{lf,Q}$ is encoded using the lowest frequency coefficient of the set of frequency coefficients.

In step 105, a module AC encodes the differential luminance component $L_r$ using the remaining frequency coefficients of the set of frequency coefficients, i.e. those of the set of frequency coefficients which have not been used for encoding the quantized luminance component $L_{lf,Q}$.

The set of frequency coefficients is then encoded (for example quantized and entropy-encoded) by means of the encoder ENC1, and added to a bitstream F which may be store and/or transmitted over a communication network.

According to an embodiment of the method, the module IC is configured to obtain at least colour component C(i) of the image block B.

Then, at step 108, each colour component C(i) is encoded (for example quantized and entropy-encoded) by means of an encoder ENC2.

The output of the step 108 is added to the bitstream F.

According to an embodiment of the method, the components of the image block B belong to a perceptual space, usually a 3D space, i.e. the image block B comprises a luminance component L and potentially at least one colour component C(i), for example two, referred as C1 and C2 in what follows.

A perceptual space has a metric d((L,C1,C2),(L',C1',C2')) whose values are representative of, preferably proportional to, the differences between the visual perceptions of two points of said perceptual space.

Mathematically speaking, the metric d((L, C1,C2),(L', C1',C2')) is defined such that a perceptual threshold $\Delta E_0$ (also referred to as the JND, Just Noticeable Difference) exists below which a human being is not able to perceive a visual difference between two colours of the perceptual space, i.e.

$$d((L,C1,C2),(L',C1',C2')) < \Delta E_0, \quad (1)$$

and this perceptual threshold is independent of the two points (L, C1, C2) and (L', C1', C2') of the perceptual space.

Thus, encoding an image block whose components belong to a perceptual space in order that the metric d of equation (1) stays below the perceptual threshold $\Delta E_0$ ensures that the displayed decoded version of the image block is visually lossless.

According to an embodiment, the metric may be calculated on a pixel base.

It may be noted that, in practice, it is easier to control the three following inequalities individually:

$$d(L,L') < \Delta E_0^L, d(C1,C1') < \Delta E_0^{C1} \text{ and } d(C2,C2') < \Delta E_0^{C2}$$

It may be noted that, if the equation (1) is fulfilled with an upper boundgreater than $\Delta E_0$, it is said, in what follows, that the encoded image block is visually controlled, i.e. the visual losses in a displayed decoded version of this image block are controlled.

When the image block B comprises components belonging to a non perceptual space such as (R,G,B) for example, a perceptual transform is applied to the image I in order to obtain a luminance component L and potentially two colours components C1 and C2 which belong to the perceptual space.

Such a perceptual transform is defined from the lighting conditions of the display and depends on the initial colour space.

For example, assuming the initial space is the (R,G,B) colour space, the image I is first transformed to the well-known linear space (X, Y, Z) (an inverse gamma correction may be potentially needed) and the resulting image block is then transformed from reference lighting conditions of the display of a decoded version of the encoded image block which are here a 3D vector of values $(X_n,Y_n,Z_n)$ in the (X,Y,Z) space.

Consequently, for example, such a perceptual transform is defined as follows when the perceptual space LabCIE1976 is selected:

$$L^* = 116f(Y/Y_n) - 16$$

$$a^* = 500(f(X/X_n) - f(Y/Y_n))$$

$$b^* = 200(f(Y/Y_n) - f(Z/Z_n))$$

where f is a conversion function for example given by:

$$f(r) = r^{1/3} \text{ if } r > (6/29)^3$$

$$f(r) = \frac{1}{3} * \left(\frac{29}{6}\right)^2 * r + \frac{4}{29} \text{ otherwise}$$

The following metric may be defined on the perceptual space LabCIE1976:

$$d((L^*,a^*,b^*),(L^{*\prime},a^{*\prime},b^{*\prime}))^2 = (\Delta L^*)^2 + (\Delta a^*)^2 + (\Delta b^*)^2 < (\Delta E_0)^2$$

with $\Delta L^*$ being the difference between the luminance components of the two colours $(L^*, a^*, b^*)$ and $(L^{*\prime}, a^{*\prime}, b^{*\prime})$ and $\Delta a^*$ (respectively $\Delta b^*$) being the difference between the colour components of these two colours.

According to another example, when the perceptual space Lu*v* is selected, a perceptual transform is defined as follows:

$$u^* = 13L(u' - u'_{white}) \text{ and } v^* = 13L(v' - v'_{white})$$

where $$u' = \frac{4X}{X + 15Y + 3Z}, v' = \frac{9Y}{X + 15Y + 3Z},$$

and $$u'_{white} = \frac{4X_n}{X_n + 15Y_n + 3Z_n}, v'_{white} = \frac{9Y_n}{X_n + 15Y_n + 3Z_n}.$$

The following Euclidean metric may be defined on the perceptual space Lu*v*:

$$d((L^*,u^*,v^*),(L^{*\prime},u^{*\prime},v^{*\prime}))^2 = (\Delta L)^2 + (\Delta u^*)^2 + (\Delta v^*)^2$$

with $\Delta L^*$ being the difference between the luminance components of the two colours $(L^*, u^*, v^*)$ and $(L^{*\prime}, u^{*\prime}, v^{*\prime})$ and $\Delta u^*$ (respectively $\Delta v^*$) being the difference between the colour components of these two colours.

The disclosure is not limited to the perceptual space LabCIE1976 but may be extended to any type of perceptual space such as the LabCIE1994, LabCIE2000, which are the same Lab space but with a different metric to measure the perceptual distance, or any other Euclidean perceptual space for instance. Other examples are LMS spaces and IPT spaces. A condition is that the metric shall be defined on these perceptual spaces in order that the metric is preferably proportional to the perception difference; as a consequence, a homogeneous maximal perceptual threshold $\Delta E_0$ exists below which a human being is not able to perceive a visual difference between two colours of the perceptual space.

According to an embodiment, in step 109, the luminance component L of the image block B belongs to a perceptual space, having a metric whose values are representative of the differences between the visual perceptions of two points of said perceptual space, the metric being defined such that a perceptual threshold $\Delta E_0$ exists below which a human being is not able to perceive a visual difference between two colours of the perceptual space. Then, a module T obtains a transformed differential luminance component by transforming the differential luminance component $L_r$ before encoding (step 105) according to a transform T which depends on an upper bound of the metric $\Delta E$ which enables a control of the visual losses in a displayed decoded version of the image block.

According to an embodiment, in step 109, each colour component C(i) of the image block B belongs to a perceptual space having a metric whose values are representative of the differences between the visual perceptions of two points of said perceptual space, the metric being defined such that a perceptual threshold $\Delta E_0$ exists below which a human being is not able to perceive a visual difference between two colours of the perceptual space. Then, in step 109, a module T obtains a transformed colour component for each colour component, each transformed colour component is obtained by transforming a colour component C(i) of the image block according to the transform T which depends on an upper bound of the metric LE which enables a control of the visual losses in a displayed decoded version of the image block.

In step 110, the upper bound $\Delta E$ is determined according to reference lighting conditions of the display of a decoded version of the encoded image block and according to either the quantized luminance component $L_{lf,Q}$ of the image block or a decoded version $\widehat{L_{lf,Q}}$ of the encoded quantized luminance component of the image block B.

The embodiment illustrated in FIG. 2, ensures that the upper bound $\Delta E$ is the same on both the encoder and the decoder side.

The brightness of to either the quantized luminance component $L_{lf,Q}$ of the image block or a decoded version $\widehat{L_{lf,Q}}$ of the encoded quantized luminance component of the image block is not constant over the image but changes locally. For example, if the low-spatial-frequency version $L_{lf}$ is quantized by assigning a same quantization value to each pixel of the image block, the upper bound $\Delta E$ is constant over the image block but the quantization values of two blocks of the image may be different. Consequently, the upper bound $\Delta E$ changes locally according to the brightness values of the image.

According to an embodiment of the step 110, assuming, during the display of the image at which the image block B belongs, a potential increase of the lighting until a maximal environmental brightness value $Y_n$, the upper bound $\Delta E$ is determined from the ratio of the brightness value $Y_Q$ of either the quantized luminance component $L_{lf,Q}$ of the image block or a decoded version $\widehat{L_{lf,Q}}$ of the encoded quantized luminance component of the image block over the maximal environmental brightness value $Y_n$.

According to an embodiment of the step 110, when the coding degradation over the maximal environmental brightness value is forbidden, the upper bound $\Delta E$ is then given by:

$$\Delta E = \Delta E_{enc}\left(\frac{Y_Q}{Y_n}\right)^{\frac{1}{3}} = \frac{\Delta E_{enc}(L_{lf,Q} + 16)}{116} \quad (2)$$

with $(X_n, Y_n, Z_n)$ being reference lighting conditions of the display of a decoded version of the encoded image block and $Y_Q$ being a value which represents the brightness of either the quantized luminance component $L_{lf,Q}$ of the image block or a decoded version $\widehat{L_{lf,Q}}$ of the encoded quantized luminance component of the image block and $\Delta E_{enc}$ being a perceptual encoding parameter. Typically, $\Delta E_{enc}$ is chosen close to $\Delta E_0$ for visually lossless encoding and greater than $\Delta E_0$ for an encoding with a control of the visual losses in the encoded image block.

Thus, using such an upper bound ΔE allows adapting the encoding to the environmental lighting conditions of the display of a decoded version of the encoded image block.

Alternatively, the reference lighting conditions of the display of a decoded version of the encoded image block $(X_n, Y_n, Z_n)$ which have a local character, may be replaced by global reference lighting conditions of the display of a decoded version of the encoded image block defined by $(X'_n, Y'_n, Z'_n) = (X_n, Y_n, Z_n) Y_Q/Y_n$.

From a coding point of view (color coding), this replacement is equivalent to the choice of the upper bound ΔE (2) because the encoding with a precision equals to ΔE of a color component a* in the color space LabCIE1976, which is given by $$a^* = 500(f(X/X_n)) - f(Y/Y_n)) \approx 500((X/X_n)^{1/3} - (Y/Y_n)^{1/3})$$

is equivalent to the encoding with a precision equals to $\Delta E_{enc}$ of the color component a*' which is given by $$a^{*\prime} = 500(f(X/X'_n) - f(Y/Y'_n)) \approx 500((X/X'_n)^{1/3} - (Y/Y'_n)^{1/3})$$

The same remark applies to the other component b*. Therefore, instead of changing the perceptual space locally, one just adapts upper bound from $\Delta E_{enc}$ to ΔE.

According to an embodiment of the step 110, to avoid a sub-coding of an image block having high brightness values, the upper bound ΔE is given by $$\Delta E = \Delta E_{enc} \min\left\{\left(\frac{Y_Q}{Y_n}\right)^{1/3}, E_{max}\right\}$$

where an upper-bound is set to $\Delta E_{enc} E_{max}$, typically, $E_{max}$ is set to 1. This last equation means that the brightness of either the quantized luminance component $L_{lf,Q}$ of the image block or a decoded version $\widetilde{L_{lf,Q}}$ of the encoded quantized luminance component of the image block is never taken bigger than the maximal environmental brightness value $Y_n$.

On the other hand, in order to avoid over-coding of an image block having very low brightness values, the upper bound ΔE in then is given by $$\Delta E = \Delta E_{enc} \max\left\{\left(\frac{Y_Q}{Y_n}\right)^{1/3}, E_{min}\right\}$$

where a lower-bound is set to $\Delta E_{enc} E_{min}$; typically, $E_{min}$ is set to about 1/5. This is due to a contrast masking effect of the dark local brightness of either the quantized luminance component $L_{lf,Q}$ of the image block or a decoded version $\widetilde{L_{lf,Q}}$ of the encoded quantized luminance component of the image block by the maximal environmental brightness value $Y_n$.

A combination of both bounds is simply obtained by $$\Delta E = \Delta E_{enc} \min\left\{\max\left\{\left(\frac{Y_Q}{Y_n}\right)^{1/3}, E_{min}\right\}, E_{max}\right\}$$

According to an embodiment of the step 109, the transform T is a normalization of the differential luminance component $L_r$ and potentially of each color component by means of the upper bound ΔE.

The transform T is thus a function of the upper bound which changes locally.

According to an embodiment of the step 109, the normalization of the differential luminance component $L_r$ and potentially of each color component by means of the upper bound ΔE is the division of the differential luminance component $L_r$, and potentially of each color component, by a value which is a function of the upper bound ΔE.

Mathematically speaking, the differential luminance component $L_r$ is then transformed, for example, as follows to get a transformed version of the differential luminance component $L_r^T$:

$$L_r^T = T(L_r, \Delta E) = \frac{L_r}{\Delta E^\alpha}$$

and, potentially, each color component $C(i)$ is then transformed, for example, as follows to get a transformed colour component $C(i)^T$:

$$C(i)^T = T(C(i), \Delta E) = \frac{C(i)}{\Delta E^\alpha}$$

with α being a value equals, for example, to 0.5 or 1.

This embodiment is advantageous, in particular to ensure a good quantizing of the dark image block. Actually, dark zones of an image block have very low luminance pixel values which may be much lower than 1. Thus, if no normalization by means of the upper bound ΔE is performed, all these pixels will be mapped to 0 before quantizing, missing the wanted perceptual quantizing precision. The normalization by means of the upper bound ΔE, which is small in such image blocks, stretches the pixel values allowing a sufficient format precision before quantizing. Also, for very bright pixels, the normalization avoids too large pixel values by dividing the pixel values by the upper bound ΔE which is much bigger than 1 in bright image blocks.

Thus, the visual losses of the transformed version of the differential luminance component $L_r^T$ (and potentially each color component $C(i)^T$) depends on the value of the upper bound ΔE. A visually-lossless quantization is thus reaches when the upper bound ΔE is lower than or equal to the perceptual threshold $\Delta E_0$.

According to another embodiment of the step 104 and/or 105, at least one parameter of the encoding of the luminance component $L_{lf,Q}$ and/or of the differential luminance component $L_r$ depends on the upper bound ΔE.

For example, a parameter of the quantization QP of such an encoding depends on the upper bound ΔE. Actually, such a parameter QP exists in image/video coders like h264/AVC and HEVC and may be defined locally for each coding block. In this example, a local QP may be chosen to ensure a determined coding precision such as, for example, a lossless encoding.

Advantageously, the quantized luminance component $L_{lf,Q}$ is lossless encoded (step 104).

This embodiment ensures that the upper bound ΔE is the same on both the encoder and the decoder side when the upper bound ΔE is obtained from the quantized luminance component $L_{lf,Q}$.

Figure 3:
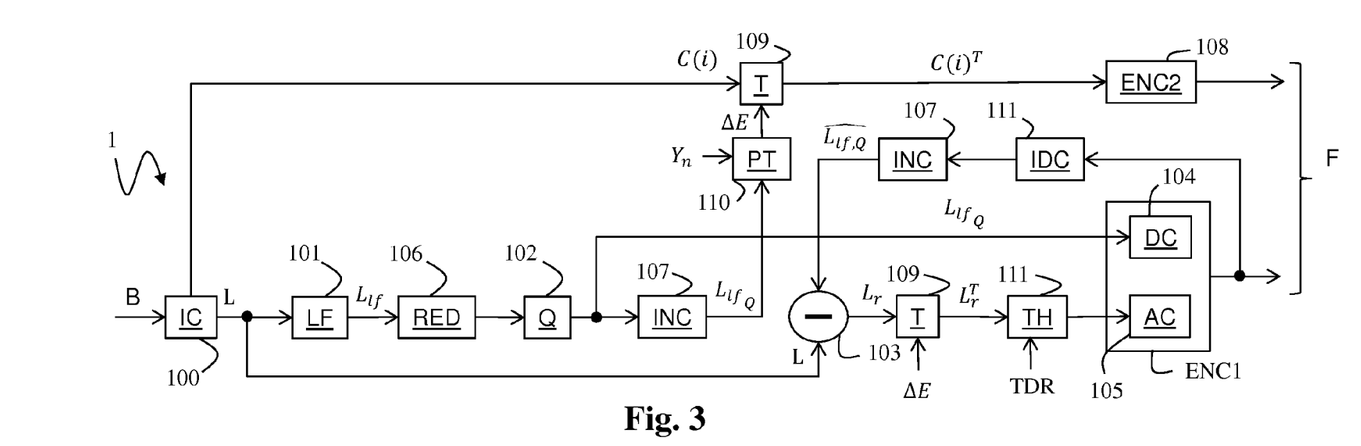
FIG. 3 shows a block diagram of the steps of a method for encoding an image block B in accordance with a variant of the embodiment of the disclosure.

According to an embodiment of the method, illustrated in FIGS. 2, 3 and 4, in step 111, a module IDC obtains a decoded version $\widetilde{L_{lf,Q}}$ of the encoded quantized luminance component of the image block.

More precisely, the quantized luminance component $L_{lf,Q}$ of an image block is encoded according to step 104, and then decoded to obtain the decoded version $\widetilde{L_{lf,Q}}$ of the encoded quantized luminance component of the image block uses by the step 103 or 110.

According to an embodiment of the method, in step 106, a module RED reduces the original dynamic range of the low-spatial-frequency version $L_{lf}$ before quantizing (step 102) the low-spatial-frequency version $L_{lf}$, and a module INC increases the dynamic range of either the quantized luminance component $L_{lf,Q}$ of the image block or a decoded version $\widetilde{L_{lf,Q}}$ of the encoded quantized luminance component of the image block (step 107) to reach the original dynamic range before calculating the differential luminance component $L_r$ (step 103).

Then, the pixels values of the quantized luminance component $L_{lf,Q}$, input of the step 104, belong to a reduced dynamic range and the pixels values of either the quantized luminance component $L_{lf,Q}$ of the image block or a decoded version $\widetilde{L_{lf,Q}}$ of the encoded quantized luminance component of the image block, input of the step 103, belong to the original dynamic range of the luminance component L of the image block B.

This embodiment is advantageous because it requires an encoder ENC1 of n bits (number of bits for the quantization), typically 8, 10 or 12 bits, to encode the quantized luminance component $L_{lf,Q}$.

According to a variant of this embodiment, the module INC is also configured to increase the dynamic range either the quantized luminance component $L_{lf,Q}$ of the image block or a decoded version $\widetilde{L_{lf,Q}}$ of the encoded quantized luminance component of the image block (step 107) to reach the original dynamic range before determining the upper bound (step 110).

It may be noted that according to this variant, when the coding degradation over the maximal environmental brightness value is forbidden, the u ΔE (step 110) is then given by:

$$\Delta E = \Delta E_{enc} \left( \frac{Y_Q}{Y_n} \right)^{\frac{1}{3}} = \frac{\Delta E_{enc} L^O}{116} \quad (3)$$

with $L^O$ being the version (either $L_{lf,Q}$ or $\widetilde{L_{lf,Q}}$ of the low-spatial-frequency version whose pixels values belong to the original dynamic range (step 110).

Mathematically speaking, when the reduction of the dynamic range is obtained by applying a dynamic-range-reduction function $f$ on the version (either $L_{lf,Q}$ or $\widetilde{L_{lf,Q}}$ of the low-spatial-frequency version, then the version (either $L_{lf,Q}$ or $\widetilde{L_{lf,Q}}$ of the low-spatial-frequency version $L^O$ whose pixel values belong to a dynamic range equals to the original dynamic range is given by:

$$L^O = f^{-1}(f(L))$$

with $f(L)$ being the version (either $L_{lf,Q}$ or $\widetilde{L_{lf,Q}}$ of the low-spatial-frequency version whose pixels values belong to the reduced dynamic range, i.e. either $f(L_{lf,Q})$ or $f\widetilde{L_{lf,Q}}$.

According to a variant of this embodiment, the dynamic-range-reduction function $f$ has mainly a logarithm shape or a S-log shape with Y, i.e. $f: Y \rightarrow \alpha \ln(Y+\beta)+\gamma$.

According to a variant of this embodiment, the dynamic-range-reduction function $f$ has mainly a power in Y, i.e. $f: Y \rightarrow Y^\gamma$ with typically γ smaller than 1 to ensure dynamic compression.

According to a variant of this embodiment, the dynamic-range-reduction function $f$ is a monotone function. For instance the transfer functions suggested in the document "*Image dynamic range in television systems*", ITU, Document 6C/77-E, 2 Oct. 2012, may be used.

The differential luminance component $L_r$ (or the transformed version of the differential luminance component $L_r^T$) of the image block B may have a dynamic range which is relatively important, for example, when some of its pixels belong to a dark region and some other belong to a brighter region.

According to an embodiment of the method for encoding an image block B, a module TH clips the differential luminance component $L_r$ (or the transformed version of the differential luminance component $L_r^T$) to reach a differential luminance component $L_r$ (or the transformed version of the differential luminance component $L_r^T$) with a dynamic range lower than or equal to a targeted dynamic range TDR.

This provides a differential luminance component $L_r$ (or a transformed version of the differential luminance component $L_r^T$) with a reduced dynamic range and the encoding efficiency of the differential luminance component $L_r$ (or the transformed version of the differential luminance component $L_r^T$) is increased without significantly degrading the quality of the differential luminance component $L_r$ (or the transformed version of the differential luminance component $L_r^T$) especially when the image block B has a small size.

According to an embodiment, the clipping is done over the interval $]-2^{TDR-1}, 2^{TDR-1}]$.

According to an embodiment, the targeted dynamic range TDR is determined according to the capabilities of an encoding/decoding scheme (step 105).

This is advantageous because a traditional 8-10 bit-depth encoder scheme may be used to encode the image block B.

Figure 5:
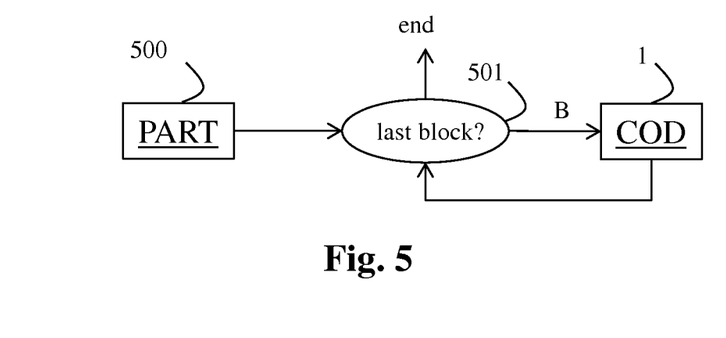
FIG. 5 shows a block diagram of the steps of a method for encoding an image I in accordance with an embodiment of the disclosure.

FIG. 5 shows a block diagram of the steps of a method for encoding an image I.

In step 500, a module PART obtains at least one image block B from the image I.

Next, each image block of the set of blocks is then encoded according to a module COD (step 1) which is described above in relation with the FIG. 1-4. The bitstream F comprises then data for each encoded image block B.

This embodiment is advantageous when at least one image block obtains from the image I comprises a luminance component which belongs to a low dynamic range, i.e. when its pixels belong to a same object or a background of the image and not an edge between two regions with different dynamic ranges. Thus, the number of bits to encode such kind of image blocks, for example by means of the encoding described in relation with the FIG. 1-4, is reduced.

Figure 6:
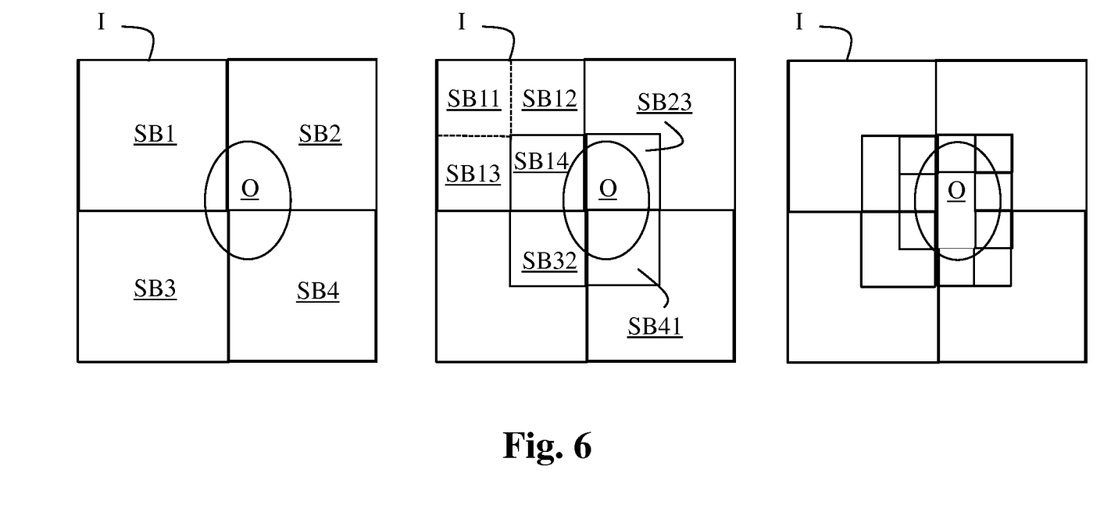
FIG. 6 illustrates an example of a partition of an image I.

According to an embodiment of the step 500, illustrated in FIG. 6, said at least one image block is obtained by recursively dividing an image block until a criteria is reached.

According to an embodiment, the criteria is reached when the dynamic range of an image block become below a determined threshold.

According to another embodiment, the criteria is reached when a determined number of iterations is reached.

According to the illustrative example given in FIG. 6, assuming an image I with an object O having its pixel values which belong to a higher dynamic range than the dynamic range of the pixel values of the background of the image I. Furthermore, assuming that a threshold is determined in order that when an image block comprises both pixels of the background and pixels of the object O, the dynamic range of image block is above the threshold.

This example is not imitative and the disclosure extends to any definition of the threshold to reach a final image block which comprises pixels belonging to low dynamic ranges.

The disclosure is not limited to any specific splitting of an image block. For example, an image block may be split into four image blocks and image blocks at a same level which comprises either pixels of the object O or pixels of the background are merged together.

According to such a division/merging process, first, the image I (level 0) is divided into four image blocks SB1, . . . , SB4 as illustrated in FIG. 6. Because each of these image blocks comprises pixels of the background and pixels of the object O (left part of FIG. 6), the dynamic range of each image block SBi (i=1, . . . , 4) is above the threshold. The image block SB1 is then divided into four image blocks SB11, SB12, SB13 and SB14 (central part of FIG. 6). The image blocks SB11, SB12 and SB13 (level 1) comprises only pixels of the background. They are then merged together. The image blocks SB2, SB3 and SB4 are divided and some of the resulting image blocks (level 1) are also merged together. The image blocks SB14, SB23, SB32 and SB41 are then divided (level 2) and the final image blocks are given on the left part of FIG. 6.

It may be noted that the final image blocks form a partition of the image I.

Figure 7:
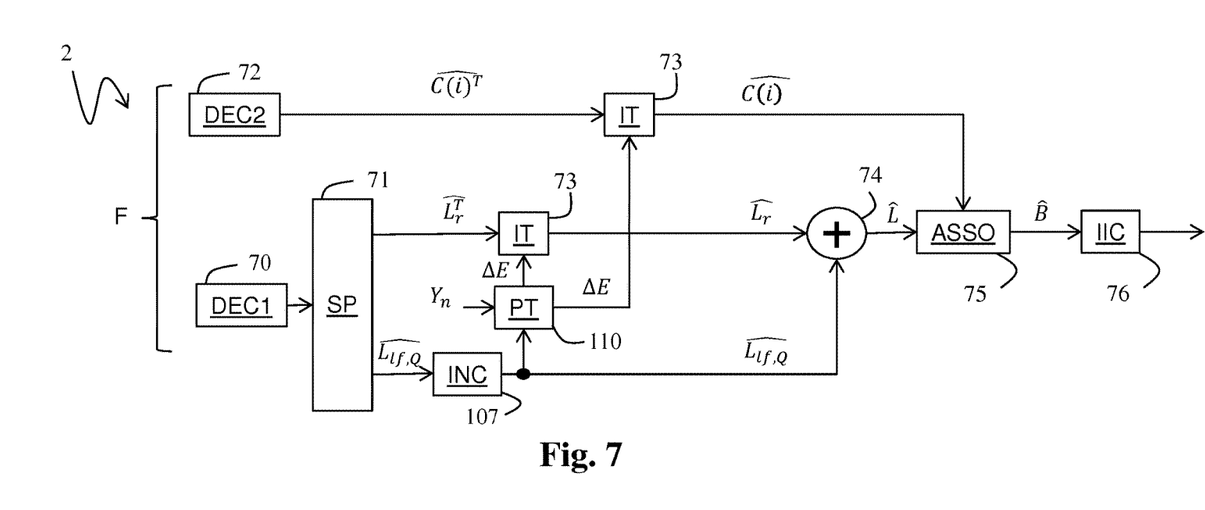
FIG. 7 shows a block diagram of the steps of a method, in accordance with an embodiment of the disclosure, for decoding a bitstream representing a luminance component and at least one transformed colour component of an image block.

FIG. 7 shows a block diagram of the steps of a method for decoding a bitstream F representing a luminance component and potentially at least one transformed colour component of an image block B.

In step 70, a set of frequency coefficients is obtained by a at least partially decoding of the bitstream F by means of a decoder DEC1. The set of frequency coefficients is relative to the image block B to be decoded.

In step 71, a module SP splits the set of frequency coefficients into two subsets of frequency coefficients: one represents an estimate $\widehat{L_{lf,Q}}$ of a low-spatial-frequency version of a luminance component, and the other one represents an estimate $\widehat{L_r}$ of a differential luminance component.

According to an embodiment, described above in relation with the step 106, when the dynamic range of the quantized luminance component $L_{lf,Q}$ of the image block B has been reduced before quantization (step 102), the estimate $\widehat{L_{lf,Q}}$ has pixels values which belong to the reduced dynamic range. Thus, during the step 107, a module INC increases the dynamic range of the estimate $\widehat{L_{lf,Q}}$ to reach a target dynamic range such as, for example, the original dynamic range of the luminance component L of the image block B.

The estimate $\widehat{L_r}$ represents the difference between the luminance component L of the image block B and a version of the low-spatial-frequency version of the luminance component of the image block B.

According to an embodiment, when the differential luminance component $L_r$ has been transformed (step 109) an estimate $\widehat{L_r^T}$ of a differential luminance component is obtained during the step 71.

Then, in step 73, a module IT transforms the estimate $\widehat{L_r^T}$ by applying an inverse-transform IT. Said inverse-transform IT depends on the upper bound ΔE.

It may be noted that the term "inverse-transform" stands for a transform which has a reverse function compared to the function of the transform T which has been applied during the step 109.

According to an embodiment, when the transform T is a normalization by means of a upper bound ΔE, the transform IT is a re-normalization of the estimate $\widehat{L_r^T}$ by means of the upper bound ΔE.

Then, in step 110, the upper bound ΔE determined, as described above.

Thus, according to an embodiment, the upper bound ΔE is determined according to reference lighting conditions of the display of a decoded version of the encoded image block and the estimate $\widehat{L_{lf,Q}}$ of a version of the low-spatial-frequency version of the luminance component of the image block B (output of step 71).

According to an embodiment of the step 109, the re-normalization is the multiplication by a value which is a function of the upper bound ΔE.

Mathematically speaking, the estimate $\widehat{L_r^T}$ is inverse-transformed, for example, as follows:
$$\widehat{L_r} = IT(\widehat{L_r^T}, \Delta E) = \widehat{L_r^T} \cdot \Delta E^\alpha$$

with α being a value equals, for example, to 0.5 or 1.

In step 74, the estimate $\widehat{L_{lf,Q}}$ and the estimate $\widehat{L_r}$ are added together to get an estimate $\hat{B}$ of the decoded image block B which comprises an estimate $\hat{L}$ of its luminance component.

According to an embodiment of the method, in step 72, an estimate $\widehat{C(i)}$ of each colour component is obtained by a at least partially decoding of the bitstream F by means of a decoder DEC2.

According to an embodiment, when each colour component C(i) has been transformed (step 109) an estimate $\widehat{C(i)^T}$ of each colour component is obtained during the step 72.

Then, in step 73, the module IT transforms the estimate $\widehat{C(i)^T}$ by applying an inverse-transform IT as described above.

According to an embodiment of the method, in step 75, a module ASSO is configured to associate the estimate $\hat{L}$ with the estimate $\widehat{C(i)}$ to get an estimate $\hat{B}$ of the image block B.

According to a variant, in step 76, a module IIC is configured to apply an inverse perceptual transform to the estimate $\hat{B}$, output of step 75 or 74 when no colour component. For example, the estimate $\hat{B}$ is transformed to the well-known space (X, Y, Z).

When the perceptual space LabCIE1976 is selected, the inverse perceptual transform is given by:

$$X = X_n f^{-1}\left(\frac{1}{116}(L^* + 16) + \frac{1}{500}a^*\right)$$
$$Y = Y_n f^{-1}(1/116(L^* + 16))$$
$$Z = Z_n f^{-1}\left(\frac{1}{116}(L^* + 16) + \frac{1}{200}b^*\right)$$

When the perceptual space Luv is selected, the inverse perceptual transform is given by:

$$X = \frac{9Yu'}{4v'}$$

-continued $$Y = Y_n f^{-1}\left(\frac{1}{116}(L^* + 16)\right)$$

$$Z = \frac{3Y(4-u')}{4v'} - 5Y$$

Potentially, the image in the space (X,Y,Z) is inverse transformed to get the estimate $\hat{B}$ in the initial space such as (R,G,B) space.

Potentially, in steps 104, 105, 108, 70 and 72, the encoder/decoder ENC1/DEC1 and/or ENC2/DEC2 comprises an entropy encoding.

The decoder DEC1, respectively DEC2, is configured to decode data which have been encoded by the encoder ENC1, respectively ENC2.

The encoders ENC1 and/or ENC2 (and decoders DEC1 and/or DEC2) is not limited to a specific encoder (decoder) but when an entropy encoder (decoder) is required, an entropy encoder such as a Huffmann coder, an arithmetic coder or a context adaptive coder like Cabac used in h264/AVC or HEVC is advantageous.

Figure 8:
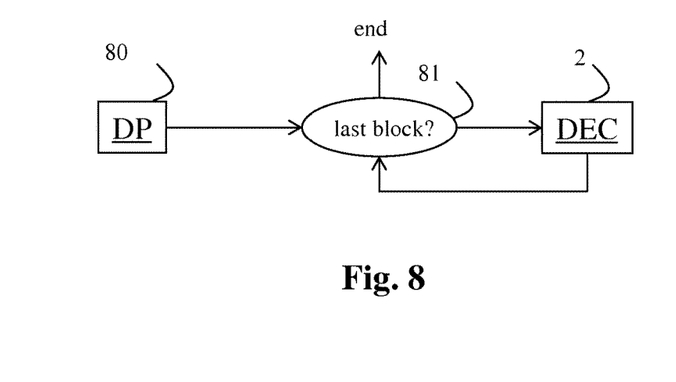
FIG. 8 shows a block diagram of the steps of a method for decoding an image I in accordance with an embodiment of the disclosure.

FIG. 8 shows a block diagram of the steps of a method for decoding an image I from a bitstream F.

It may be noted that decoding an image consists in decoding each image block relative to this image. It may also be noted that, when multiple image blocks are considered, they may form a partition of the image. Sometimes, the partition may be transmitted over a communication network.

In step 80, a module DP obtains from the bitstream F data relative to at least one image block of an image I to be decoded.

Next, data relative to each image each image block is then decoded according to a module DEC (step 2) which is described above in relation with the FIG. 7.

On FIG. 1-8, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 9:
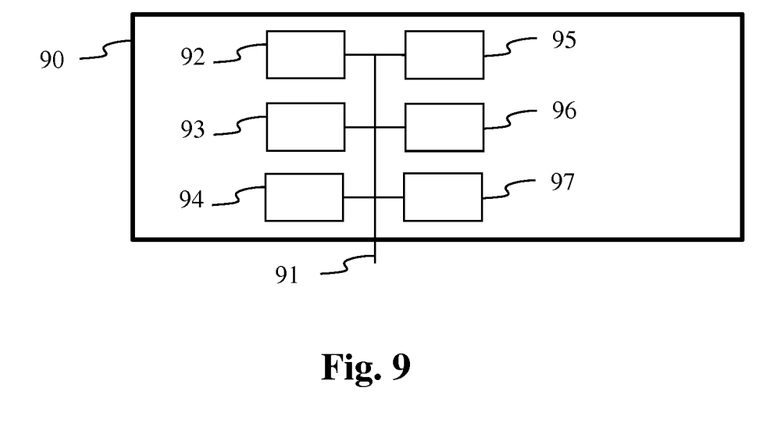
FIG. 9 shows an example of an architecture of a device.

FIG. 9 represents an exemplary architecture of a device 90 which may be configured to implement a method described in relation with FIGS. 1 to 8.

Device 90 comprises following elements that are linked together by a data and address bus 91:
- a microprocessor 92 (or CPU), which is, for example, a DSP (or Digital Signal Processor);
- a ROM (or Read Only Memory) 93;
- a RAM (or Random Access Memory) 94;
- an I/O interface 95 for reception of data to transmit, from an application; and
- a battery 96

According to a variant, the battery 96 is external to the device.

Each of these elements of FIG. 9 are well-known by those skilled in the art and won't be disclosed further. In each of mentioned memory, the word «register» used in the specification can correspond to area of small capacity (some bits) or to very large area (e.g. a whole program or large amount of received or decoded data). ROM 93 comprises at least a program and parameters. Algorithm of the methods according to the disclosure is stored in the ROM 93. When switched on, the CPU 92 uploads the program in the RAM and executes the corresponding instructions.

RAM 94 comprises, in a register, the program executed by the CPU 92 and uploaded after switch on of the device 90, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to an embodiment, the device further comprises means for obtaining reference lighting conditions of the display of a decoded version of the encoded image block such as a maximal environmental brightness value $Y_n$.

According to an embodiment, the device comprises a display 97 and the means for obtaining reference lighting conditions of the display of a decoded version of the encoded image block are configured to determine such reference lighting conditions from some characteristics of the display 97 or from lighting conditions around the display 96 which are captured by the device.

For instance, the means for obtaining a maximal environmental brightness value $Y_n$ are a sensor attached to the display and which measures the environmental conditions. A photodiode or the like may be used to this purpose.

Figure 10:
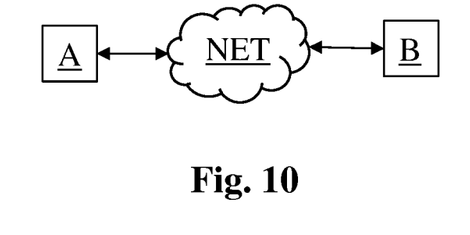
FIG. 10 shows a two remote devices communicating over a communication network.

According to an embodiment illustrated in FIG. 10, in a transmission context between two remote devices A and B over a communication network NET, the device A comprises means which are configured to implement a method for encoding an image as described in relation with the FIGS. 1-6 and the device B comprises means which are configured to implement a method for decoding as described in relation with FIG. 7-8. The device B may also comprise a display 97.

The devices A and B are both configured to know the reference lighting conditions of the display of a decoded version of the encoded image block such a same maximal environmental brightness value $Y_n$.

For example, the devices A and B store the same reference lighting conditions of the display of a decoded version of the encoded image block such a same maximal environmental brightness value $Y_n$.

Alternatively, the device B is configured to obtain the reference lighting conditions of the display of a decoded version of the encoded image block such a maximal environmental brightness value $Y_n$ and to send it to the device A. The device A is then configured to receive such a transmitted reference lighting conditions of the display of a decoded version of the encoded image block such a maximal brightness value $Y_n$.

Inversely, the device A is configured to obtain the reference lighting conditions of the display of a decoded version of the encoded image block such a maximal environmental brightness value $Y_n$, for example from a storing memory, and to send it to the device B. The device B is then configured to receive such a transmitted reference lighting conditions of the display of a decoded version of the encoded image block such a maximal environmental brightness environmental value $Y_n$.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding an image block comprising:
   obtaining a mean luminance component of the image block by assigning to each pixel of the image block a mean value computed by averaging the pixel values of the image block;
   obtaining a quantized mean luminance component of the image block by quantizing the mean luminance component of the image block;
   obtaining a differential luminance component of the image block by calculating the difference between the pixels value of the image block and either the quantized mean luminance component of the image block or a decoded version of the encoded quantized mean luminance component of the image block;
   encoding the quantized mean luminance component of the image block using a lowest frequency coefficient of a set of frequency coefficients obtained from a block-based spatial-to-frequency transform for encoding the differential luminance component; and
   encoding the differential luminance component using the remaining frequency coefficients of said set of frequency coefficients.

2. The method according to the claim 1, wherein it further comprises:
   obtaining at least one colour component of the image block; and
   encoding each colour component of the image block.

3. The method according to claim 1, wherein the luminance component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and wherein the method further comprises before encoding the differential luminance component:
   obtaining a transformed differential luminance component by transforming the differential luminance component according to a transform which depends on an upper bound of the metric which enables a control of the visual losses in a displayed decoded version of the image block.

4. The method according to claim 2, wherein each colour component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and wherein the method further comprises before encoding each colour component of the image block:
   obtaining at least one transformed colour component by transforming each colour component of the image block according to a transform which depends on an upper bound of the metric which enables a control of the visual losses in a displayed decoded version of the image block.

5. The method according to claim 3, wherein the upper bound is determined according to reference lighting conditions of the display of a decoded version of the encoded image block and according to either the quantized mean luminance component of the image block or a decoded version of the encoded quantized mean luminance component of the image block.

6. The method according to claim 5, wherein the upper bound is determined from the ratio of the brightness value of either the quantized mean luminance component of the image block or a decoded version of the encoded quantized mean luminance component of the image block over a maximal environmental brightness value.

7. The method according to claim 4, wherein the transform is a normalization of the differential luminance component and potentially of each color component by means of the upper bound.

8. The method according to claim 1, wherein the original dynamic range of the mean luminance component of the image block is reduced before quantizing the mean luminance component of the image block, and the dynamic range of either the quantized mean luminance component of the image block or a decoded version of the encoded quantized mean luminance component of the image block is increased to reach the original dynamic range before calculating the differential luminance component and the upper bound.

9. The method according to claim 3, wherein the differential luminance component or the transformed differential luminance component is clipped to reach a differential luminance component or a transformed differential luminance component with a dynamic range lower than or equal to a targeted dynamic range.

10. A method for decoding a bitstream representing a luminance component of an image block comprising:
    obtaining a set of frequency coefficients by a at least partially decoding of the bitstream, said set of frequency coefficients being relative to a block-based spatial-to-frequency transform of the image block to be decoded;
    splitting the set of frequency coefficients into a lowest frequency coefficient and the remaining frequency coefficients: the lowest frequency coefficient represents an estimate of a mean luminance component, wherein each pixel of the estimate of a mean luminance component is assigned a same mean value, and the remaining of frequency coefficients represent an estimate of a differential luminance component; and
    adding together the pixels value of the estimate of the mean luminance component and the pixels value of the estimate of a differential luminance component to get an estimate of the image block.

11. A device for encoding an image block comprising a processor configured for:
    obtaining a mean luminance component of the image block by assigning to each pixel of the image block a mean value computed by averaging the pixel values of the image block;
    obtaining a quantized mean luminance component of the image block by quantizing the mean luminance component of the image block;
    obtaining a differential luminance component by calculating the difference between the pixel value of the image block and either the quantized mean luminance component of the image block or a decoded version of the encoded quantized mean luminance component of the image block;
    encoding the quantized mean luminance component of the image block using a lowest frequency coefficient of a set of frequency coefficients obtained from a block-based spatial-to-frequency transform for encoding the differential luminance component; and
    encoding the differential luminance component on the remaining frequency coefficients of said set of frequency coefficients.

12. A device for decoding a bitstream representing a luminance component of an image block, comprising a processor configured for:
    obtaining a set of frequency coefficients by a at least partially decoding of the bitstream, said set of frequency coefficients being relative to a block-based spatial-to-frequency transform of the image block to be decoded;
    splitting the set of frequency coefficients into a lowest frequency coefficient and the remaining frequency coefficients: the lowest frequency coefficient represents an estimate of a mean luminance component wherein each pixel of the estimate of the luminance component is assigned a same mean value, and the remaining of frequency coefficients represent an estimate of a differential luminance component; and
    adding together the pixels value of estimate of the mean luminance component and the pixels value of the estimate of a differential luminance component to get an estimate of the image block.

13. The method according to claim 10 wherein the bitstream further represents at least one colour component further comprising
    obtaining an estimate of each colour component by a at least partially decoding of the bitstream and by applying said inverse spatial-to-frequency transform; and
    obtaining an estimate of each colour component of the image block by associating the estimate of luminance component of the image block with the estimate of each colour component.

14. The method according to claim 13, wherein each colour component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and the inverse spatial-to-frequency transform comprises a normalization which depends on an upper bound of the metric which enables a control of the visual losses in a displayed decoded version of the image block.

15. The method according to claim 14, further comprising obtaining reference lighting conditions of the display of a decoded version of the image block such as a maximal environmental brightness value and wherein the upper bound is determined according to reference lighting conditions of the display of the estimate of the luminance component of the image block and according the estimate of a low-spatial-frequency version of the luminance of the image block.

16. The device according to claim 11, wherein the processor is further configured for:
    obtaining at least one colour component of the image block; and
    encoding each colour component of the image block.

17. The device according to claim 16, wherein each colour component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and wherein the method further comprises before encoding each colour component of the image block:
   obtaining at least one transformed colour component by transforming each colour component of the image block according to a transform which depends on an upper bound of the metric which enables a control of the visual losses in a displayed decoded version of the image block.

18. The device according to claim 12 wherein the bitstream further represents at least one colour component, and wherein the processor is configured for:
   obtaining an estimate of each colour component by a at least partially decoding of the bitstream and by applying said inverse spatial-to-frequency transform; and
   obtaining an estimate of each colour component of the image block by associating the estimate of luminance component of the image block with the estimate of each colour component.

19. The device according to claim 18 wherein each colour component of the image block belongs to a perceptual space having a metric whose values are representative of the differences between the visual perceptions of two points of said perceptual space, the metric being defined such that a perceptual threshold exists below which a human being is not able to perceive a visual difference between two colours of the perceptual space, and the inverse spatial-to-frequency transform comprises a normalization which depends on an upper bound of the metric which enables a control of the visual losses in a displayed decoded version of the image block.

20. The method according to claim 19, further comprising obtaining reference lighting conditions of the display of a decoded version of the image block such as a maximal environmental brightness value and wherein the upper bound is determined according to reference lighting conditions of the display of the estimate of the luminance component of the image block and according the estimate of a low-spatial-frequency version of the luminance of the image block.

\* \* \* \* \*

UNITED STATES PATENT AND TRADEMARK OFFICE
CERTIFICATE OF CORRECTION

PATENT NO. : 10,574,987 B2
APPLICATION NO. : 15/106242
DATED : February 25, 2020
INVENTOR(S) : Sebastien Lasserre, Fabrice Le Leannec and David Touze It is certified that error appears in the above-identified patent and that said Letters Patent is hereby corrected as shown below:

On the Title Page

1. At Column 1 (page 2, item (57) Abstract), Line 4, replace "($L_{1f,Q}$" with "($L_{1f,Q}$)"

In the Claims

2. At Column 20, Line 31, in Claim 2, replace "to the" with "to"

3. At Column 24, Line 13, in Claim 20, replace "method" with "device"

Signed and Sealed this
Twenty-sixth Day of December, 2023

Katherine Kelly Vidal
*Director of the United States Patent and Trademark Office*